(12) United States Patent
Marchukov et al.

(10) Patent No.: US 10,331,625 B2
(45) Date of Patent: Jun. 25, 2019

(54) MANAGING SEQUENTIAL DATA STORE

(71) Applicant: Facebook, Inc., Menlo Park, CA (US)

(72) Inventors: Mark V. Marchukov, Mountain View, CA (US); Lovro Puzar, London (GB)

(73) Assignee: Facebook, Inc., Menlo Park, CA (US)

( * ) Notice: Subject to any disclaimer, the term of this patent is extended or adjusted under 35 U.S.C. 154(b) by 679 days.

(21) Appl. No.: 14/861,784

(22) Filed: Sep. 22, 2015

(65) Prior Publication Data
US 2017/0083535 A1    Mar. 23, 2017

(51) Int. Cl.
| | |
|---|---|
| G06F 17/30 | (2006.01) |
| G06F 16/17 | (2019.01) |
| G06F 3/06 | (2006.01) |
| H04L 29/08 | (2006.01) |
| H04L 29/14 | (2006.01) |
| G06F 16/27 | (2019.01) |

(52) U.S. Cl.
CPC ......... G06F 16/1734 (2019.01); G06F 3/067 (2013.01); G06F 3/0613 (2013.01); G06F 3/0659 (2013.01); G06F 16/27 (2019.01); H04L 67/10 (2013.01); H04L 67/125 (2013.01); H04L 67/18 (2013.01); H04L 67/306 (2013.01); H04L 69/40 (2013.01)

(58) Field of Classification Search
CPC .................... G06F 17/30144; G06F 3/0613
See application file for complete search history.

(56) References Cited

U.S. PATENT DOCUMENTS

| | | | | |
|---|---|---|---|---|
| 5,966,706 | A * | 10/1999 | Biliris | G06F 16/2358 |
| 9,116,862 | B1 * | 8/2015 | Rath | G06F 11/2097 |
| 2008/0301200 | A1 * | 12/2008 | Doty | G06F 11/004 |
| 2009/0132607 | A1 * | 5/2009 | Danesi | G06F 16/164 |

* cited by examiner

*Primary Examiner* — Loc Tran
(74) *Attorney, Agent, or Firm* — FisherBroyles, LLP

(57) ABSTRACT

The disclosure is directed to storing a data log file ("log") in a distributed computing system. The log can be stored as a sequence of data records ("records"). A number of writer computers ("writers") can write to a log, and a number of reader computers ("readers") can read from the log. A log sequencer computer ("log sequencer") facilitates storage of the records in data storage nodes of the distributed computing system. When the log sequencer receives a request for appending a record to a log, the log sequencer assigns a sequence number to the record that is unique and increases monotonically within the log. When a reader requests the log, the records can be delivered to the reader in the order of their sequence numbers. Further, since the records are associated with sequence numbers, a reader can seek to arbitrary sequence number within the log.

17 Claims, 9 Drawing Sheets

MANAGING SEQUENTIAL DATA STORE

BACKGROUND

Distributed computing systems generate volumes of data. Some systems store this data as a data log file ("log"). The distributed computing system can have multiple such logs. To provide data reliability and durability, they can store multiple replicas of the logs. Also, some log storage services, in order to manage the load on a log, store the log in a distributed format. That is, they can store different portions of the log at different storage systems. For example, the log storage service can split the storage of the log to three storage systems. The log storage service can have some mechanism of determining which records of the log are stored at which storage system. While such a mechanism can minimize the load on the log compared to if the log were stored on a single storage system, it is still inefficient. Such log storage services do not provide good write availability and/or are not able to tolerate spikes in writes.

Consider an example where the log is written to a small number of storage systems, e.g., three storage systems. If any of the three storage systems fail, the log storage service may not be able to write to the log, and therefore can lead to data loss. Some log storage services deploy record placement applications that determine the storage system at which a record of the log is to be stored based on a mathematical function. The disadvantage of such log storage services is that the record placement applications can be a single point of failure. If the record placement application crashes, the log storage service can fail. Even otherwise, the mathematical function on which the record placement application is based provide only a few choices since the number of storage systems across which the log is stored is a small number, which does not help much in improving the write availability.

Also, in the current log storage services, since the number of storage systems across which the log is stored is small, they may not be able to tolerate spikes in writes. If a number of applications start writing into the log, the storage systems may be overloaded and cause a significant delay in writing the records to the log.

DETAILED DESCRIPTION

Figure 1A:
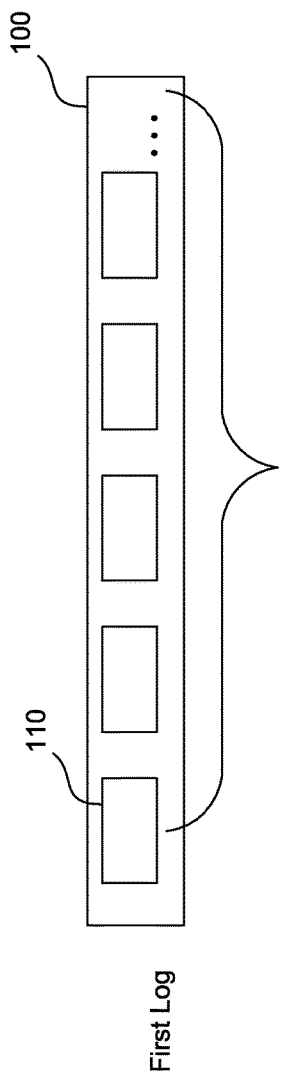
FIG. 1A is a block diagram of a structure of a log that can be stored using the disclosed embodiments.

Embodiments are disclosed for storing a data log file ("log") in a distributed computing system. A log device provides a sequential data storage system that can store the log as a sequence of data records ("records"). A number of writer computers ("writers") can write to a log, and a number of reader computers ("readers") can read from the log. A log sequencer computer ("log sequencer") in the log device facilitates storage of the records in data storage nodes of the distributed computing system. When the log sequencer receives a request for appending a record to a log, the log sequencer assigns a sequence number to the record that is unique and increases monotonically within the log. When a reader requests the log, the records can be delivered to the reader in the order of their sequence numbers. Further, since the records are associated with sequence numbers, a reader can seek to arbitrary sequence number within the log.

After the log sequencer assigns the sequence number to the record, the log sequencer determines a storage node in the distributed computing system where the record can be stored. In some embodiments, the log sequencer uses a non-deterministic method to determine the storage node where the record is to be stored. After determining the storage node, the log sequencer forwards the record to the storage node for storing the record. The storage node stores the record, e.g., in a storage device associated with the storage node. The log sequencer can place different records of the log at different storage nodes in the distributed computing system. In some embodiments, a specified log is assigned to a specified log sequencer. That is, the storage of the specified log is managed by the specified log sequencer and no more than a single log sequencer at any given time.

The embodiments decouple the process of assigning the sequence numbers to the records from the process of storing the records, e.g., components that assign sequence numbers can be separate from components that store the records. This decoupling can provide various advantages. For example, the above decoupling can provide high write availability of the distributed computing system. Since the records are assigned sequence numbers, they can be stored at any of the storage nodes; they don't have to be restricted to a specified storage node. The log sequencer can choose from a larger pool of storage nodes. If a first storage node is unavailable or overloaded, the log sequencer can choose a second storage node, or if a first group of storage nodes are unavailable or overloaded, a second group of storage nodes can be chosen. When the records are to be delivered to a reader, they can be arranged based on their sequence numbers and delivered to the reader.

In another example, the above decoupling can provide an improved tolerance towards spikes in writing the records, which can happen when a number of writers attempt to write to the log. Since the records can be stored at any of the storage nodes, the log sequencer can distribute the writes to a larger pool of the storage nodes.

The sequence number assigned to a data record can be a tuple, e.g., (epoch, count). An epoch number can be indicative of a specified series of a sequence of records, and a count can be indicative of a sequence of a specified record in the specified series. The log can have multiple series of records in which each series can have a sequence of records. For example, a sequence number (2, 2) can mean that a record is a second record in a second series of records of the log. The count is incremented for every record received at the log sequencer. However, the epoch number may not change for every record. For example, if a current epoch number is "1" and the count of the record the log sequencer last assigned is "3," the next record that arrives at the log sequencer can be assigned the sequence number (1,4), the next one (1,5) and the next one (1,6) and so on. That is, while the log sequencer increments the count of the sequence number for every record, it may not increment the epoch number. The epoch number can change upon occurrence of a specified event, when a log sequencer is failed over to another log sequencer. The new log sequencer begins a new series by updating the epoch number, e.g., incrementing the previous epoch number by "1", and resetting the count to a specified start value, e.g., "1." For example, a next record that is received at the new log sequencer for the log can be assigned the sequence number (2, 1). The sequence number (2, 1) indicates that the record is a first record in the series with number "2."

The decoupling can also help in efficient deployment of resources in the distributed computing system. For example, if the distributed computing system generates a high volume log of large records, then the distributed computing system can have more storage nodes and less log sequencers. On the other hand, if the distributed computing system generates a large number of low volume logs, then the distributed computing system can have more log sequencers and less storage nodes. In some embodiments, the log sequencers can be implemented using computers without any persistent storage medium, e.g., a disk drive, as their functionality, e.g., issuing sequence numbers, does not involve storing any data. By not using persistent storage medium in log sequencers, the costs involved in deploying resources can be minimized.

The assigning of the sequence numbers to records can also facilitate in identification of anomalies, e.g., missing data records and failure of log sequencer. Continuing with the above example, when a reader of the log identifies that a record that follows the record with a sequence number (1, 6) has a sequence number (2, 1), it identifies a change in the epoch number, which could have been caused due to a failure of the log sequencer. Since the log sequencer had failed there are chances that records received during that time, e.g., after the log sequencer failed and before the new log sequencer was instantiated, could have been lost. That is, there can be one or more records of the log missing between the records with sequence numbers (1, 6) and (2, 1). The reader can generate notifications regarding such anomalies and send them to a specified user, e.g., an administrator of the distributed computing system. Even if there were no records missing, the sequence numbering system can be still useful in identifying other anomalies. For example, a frequent change in the epoch number can indicate that the log sequencers are failing often. Such notifications can be useful for the administrator to take proper corrective measures.

Accordingly, the embodiments provide various advantages, including high write availability, improved tolerance to spikes in write operations and ability to detect and/or report anomalies in storing the logs.

Turning now to the figures, FIG. 1A is a block diagram of a structure of a log 100 that can be stored using the disclosed embodiments. The log 100 can be a collection of records 105. The records 105 can be written into the log 100 by one or more writers. A record, e.g., a first record 110, can include a variety of data. For example, in a social networking application, the first record 110 can include a user profile data of one or more users, a post, a comment and/or a message from one or more users of the social networking application. The records 105 can be of varied size. The writers can generate and/or provide the records 105 to be stored in the log 100. A log device can store the records 105 in a sequence in which a reader can read the log 100. The log device facilitates the storage of the records 105 in a sequence, e.g., by assigning a sequence number 115 to each of the records 105.

Figure 1B:
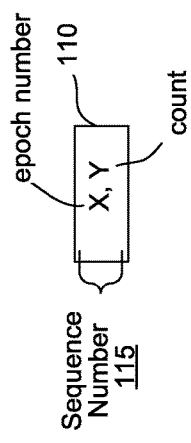
FIG. 1B is a block diagram of a record of the log of FIG. 1A having a sequence number, consistent with various embodiments.

FIG. 1B is a block diagram of a record of the log 100 having a sequence number, consistent with various embodiments. The log device assigns a sequence number, e.g., sequence number 115, to each of the records, e.g., the first record 110. The sequence number 115 can be a tuple (X, Y), where "X" can be an epoch number of the first record 110 and "Y" can be a count of the first record 110. As described above, an epoch number can be indicative of a specified series of a sequence of records, and a count can be indicative of a sequence of a specified record in the specified series. In some embodiments, the epoch number is increased monotonically, e.g., on occurrence of specified events in the distributed computing system, and the count is incremented monotonically within a specified epoch number at the receipt of a record at the log device. In some embodiments, the epoch number changes less often than the count.

Figure 1C:
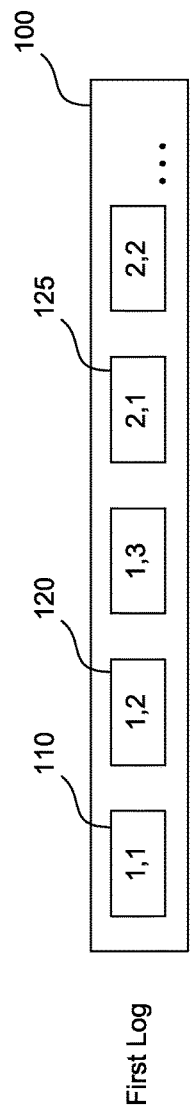
FIG. 1C is a block diagram of the log of FIG. 1A in which the records are arranged in a sequence based on their associated sequence numbers, consistent with various embodiments.

FIG. 1C is a block diagram of the log 100 in which the records 105 are arranged in a sequence based on their associated sequence numbers, consistent with various embodiments. The first record 110 has a sequence number (1,1), in which the epoch number "1" indicates that the first record 110 belongs to a first series of records in the log 100, and the count "1" indicates that the first record 110 is a first record in the sequence of records in the series "1." A second record 120 appended to the log 100 has a sequence number (1,2), in which the epoch number "1" indicates that the second record 120 belongs to the first series of records in the log 100, and the count "2" indicates that the second record 120 is a second record in the sequence of records in the series "1." Similarly, a fourth record 125 has a sequence number (2,1), in which the epoch number "2" indicates that the fourth record 125 belongs to a second series of records in the log 100, and the count "1" indicates that the fourth record 125 is a first record in the sequence of records in the series "2." In some embodiments, though the records 105 are assigned sequence numbers, they are not stored in that sequence in the log device. Different records can be stored at different storage nodes of the log device. In some embodiments, the records 105 are arranged in a sequence in the log 100 when the log 100 is delivered to a reader that is requesting the log 100.

Figure 2:
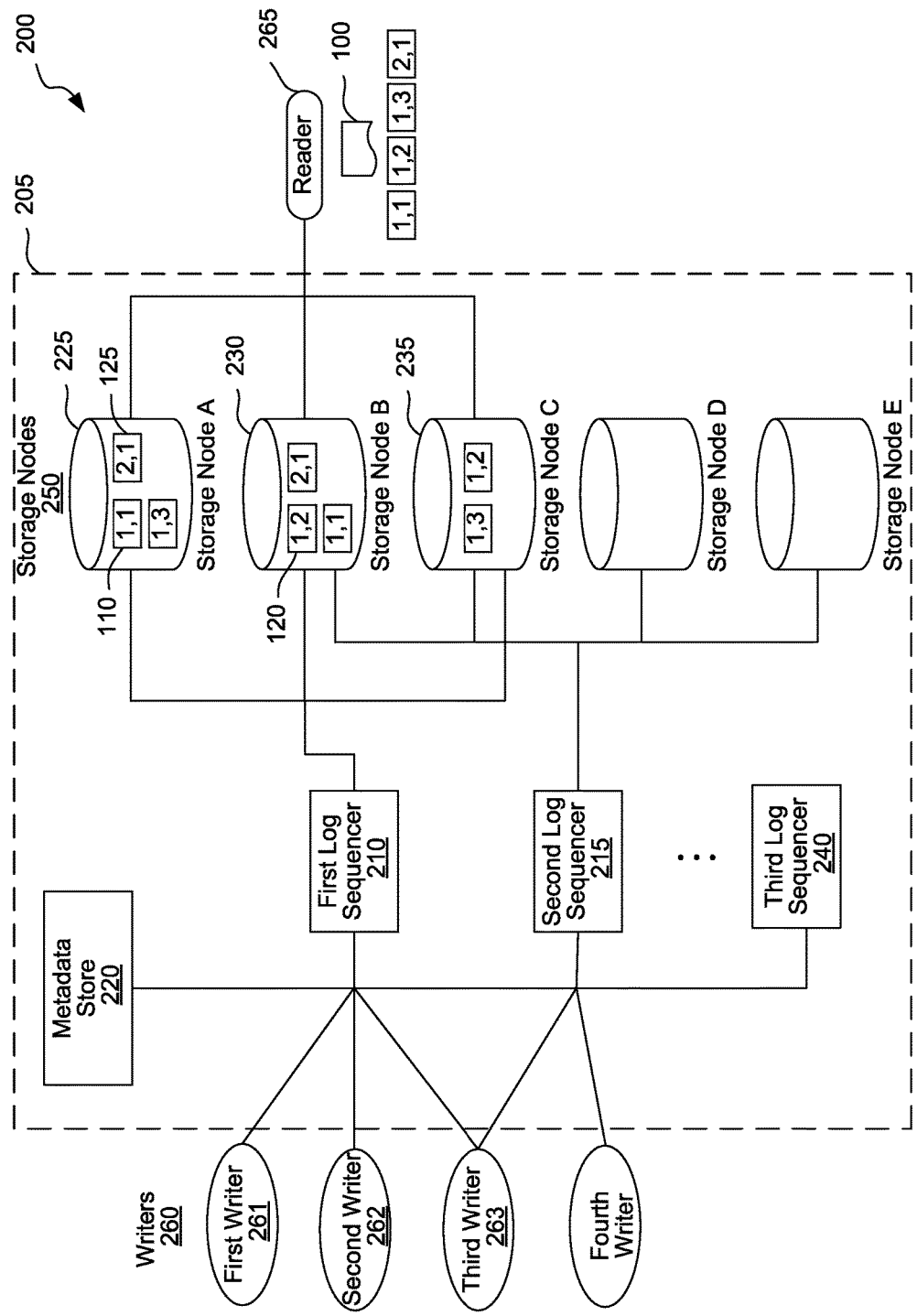
FIG. 2 is a block diagram of a distributed computing system in which a log device for facilitating read and/or write access to a log of FIGS. 1A-1C can be implemented, consistent with various embodiments.

FIG. 2 is a block diagram of a distributed computing system in which the log device for facilitating read and/or write access to the log 100 can be implemented, consistent with various embodiments. The distributed computing system 200 includes a log device 205 having multiple components that facilitates storage and retrieval of logs, e.g., the log 100 of FIG. 1. The distributed computing system 200 includes a number of writers 260 that can write to the logs. The distributed computing system 200 can store a number of logs. The distributed computing system 200 can host one or more applications, e.g., a social networking application. Different applications can write to different logs, and/or even a single application write to more than one log. For example, a social networking application, which can have a number of users, can write data associated with a first subset of the users into one log and data associated with a second subset of the users in a second log. In another example, the social networking application can include a number of sub-applications, e.g., a messaging application that facilitates exchanging messages between users and a user profile management application that facilitates management of user profiles, and different sub-applications can write to different logs.

The writers 260 can be any of the applications or a part of any of the applications hosted by the distributed computing system 200 which produce and/or provide the data that can be stored in one or more logs by the log device 205. The writers 260 provide data as records. Multiple writers can write to one log and a writer can write to more than one log. In some embodiments, a writer provides a log identifier (ID) to which the record is to be written.

The distributed computing system 200 includes one or more readers, e.g., a reader 265, that consume one or more of the logs stored in the distributed computing system 200. In some embodiments, the reader 265 is an application that is hosted by the distributed computing system 200. For example, a messaging application of the social networking application can be a reader. In some embodiments, the reader 265 expects a log, e.g., the log 100, it consumes to have the records, e.g., records 105, in a specified sequence. The log device 205 can facilitate delivering the log 100 with the records 105 arranged in the specified sequence to the reader 265.

When a writer, e.g., a first writer 261, writes a record to the log 100, the log device 205 assigns a sequence number, e.g., the sequence number 115, to the record that indicates a sequence of the record in the log 100, and stores the record in the log device 205. The log device 205 assign sequence numbers to the records 105 as and when they arrive at the log device 205 and then store them in the log device 205. When the reader 265 requests the log device 205 to deliver the log 100, the log device 205 obtains the records 105 of the log 100, arranges them in a sequence based on their sequence numbers and then delivers the log 100 for consumption by the reader 265. The records 105 can be arranged in the sequence either at the reader 265 or before being transmitted to the reader 265. In some embodiments, the records 105 are arranged in the sequence at the reader 265. The reader 265 can include a portion of the log device 205 (not illustrated) that facilitates the reader 265 to arrange the records 105 in a sequence, e.g., based on their sequence numbers, prior to consuming the log 100. The following paragraphs provide additional details with respect to storing and retrieving the logs using the log device 205 in the distributed computing system 200.

The log device 205 includes a number of log sequencers, e.g., a first log sequencer 210, that can assign sequence numbers to records of the logs. In some embodiments, at any given point of time, all writes to a specified log are managed by a single log sequencer. That is, a log sequencer can assign sequence numbers to records of a log with which the log sequencer is associated. For example, all writes to the log 100 is managed by the first log sequencer 210, and all writes to a second log (not illustrated) is managed by a second log sequencer 215. The distributed computing system 200 can determine which log sequencer manages which log, based on various factors, e.g., availability of resources. Further, in some embodiments, a user, e.g., an administrator of the distributed computing system 200, can define policies based on which the assignment of log sequencers to the logs are determined. The log device 205 can store the log sequencer and the log assignments in a storage system of the distributed computing system 200, e.g., a metadata store 220. A writer can use the metadata store 220 to determine the log sequencer to which it has to send a write request for writing a record to a specified log.

To append a first record 110 to the log 100, the first writer 261 determines the log sequencer which is assigned to the log 100, e.g., using the metadata store 220, and sends the first record 110 to the first log sequencer 210. The first log sequencer 210 assigns a sequence number to the first record 110 that is indicative of the sequence of the first record 110 in the log 100, and stores the first record 110 in one or more of the storage nodes 250 of the log device 205.

In some embodiments, assigning the sequence number to the first record 110 can include assigning (a) an epoch number that is indicative of a specified series of a sequence of records to which the first record 110 belongs and (b) a count that is indicative of a sequence of the first record 110 in the specified series. In some embodiments, the log 100, e.g., as illustrated in FIG. 1C, can have multiple series of sequences of records. For example, the log 100 has two series of records—a first series of records with epoch number "1" and a second series of records, with epoch number "2." Further, in each of the series, the log 100 has a sequence of records, e.g., in a series with epoch number "1," the log 100 has records with count of "1"-"3" and in in a series with epoch number "2," the log 100 has records with count of "1"-"2."

In some embodiments, the epoch number is a monotonically increasing number which is increased on occurrence of specified events in the distributed computing system 200, e.g., on a failover from one log sequencer to another log sequencer. In some embodiments, the count is a monotonically increasing number which is incremented within a specified epoch number at the receipt of a record at the log sequencer. In some embodiments, the epoch number changes less often than the count.

In assigning the sequence number to a record, the first log sequencer 210 determines whether the record is a first record to be appended to the log 100. If the record is the first record to be appended, the first log sequencer 210 assigns a specified start value of the epoch number, e.g., "1," and a specified start value of the count, e.g., "1" to the record, e.g., the first record 110. Further, the first log sequencer 210 can store the value of the current epoch number being used to assign to the records of the log 100 at the metadata store 220. However, if the record is not a first record, e.g., a second record such as the second record 120, to be appended to the log 100, the first log sequencer 210 assigns the current epoch number and a count that is next in sequence in the current epoch number to the record. In some embodiments, the first log sequencer 210 can obtain the current epoch number being assigned to the records of the log 100 from the metadata store 220 and assign it the second record 120. In some embodiments, the first log sequencer 210 can determine the count as a function of the count of the record last appended to the log 100 by the first log sequencer 210, e.g., incrementing the count of the record last appended by "1," and assign the updated count to the second record 120.

The first log sequencer 210 continues assigning sequence numbers to the records arriving at the first log sequencer 210 to be appended to the log 100, as described above. On occurrence of a specified event, such as the first log sequencer 210 becomes unavailable, e.g., due to a failure, the first log sequencer 210 may have to be failed over to another log sequencer, e.g., a third log sequencer 240, to manage the storage of log 100. After the failover, the third log sequencer 240 assumes the role of assigning sequence numbers to the records that arrive at the third log sequencer 240 and storing the records at the storage nodes 250. In some embodiments, the failover can be from one log sequencer to another log sequencer. In some embodiments, the failover can be from one instance of a log sequencer to another instance of the log sequencer. Another instance of the log sequencer can be instantiated by any of restarting the computer at which the log sequencer is implemented, restarting the log sequencer application and/or process without restarting the computer at which the log sequencer is implemented or restarting the application of which the log sequencer is a part.

When the third log sequencer 240 starts assigning the sequence numbers to the records to be appended to the log 100, the third log sequencer 240 changes the epoch number to be assigned to indicate a beginning of a new series of records. For example, when a first record arrives at the third log sequencer 240 after the third log sequencer 240 takes over from the first log sequencer 210, the third log sequencer obtains the epoch number last assigned to the records of the log 100 from the metadata store 220 and updates the retrieved epoch number, e.g., increments it by "1," to the next series. The third log sequencer 240 also resets the count to be assigned to the record to a start value, e.g., "1." For example, in the distributed computing system 200, the fourth record 125 is the first to arrive at the third log sequencer 240 after the third log sequencer 240 is failed over from the first log sequencer 210. The third log sequencer 240 obtains the epoch number "1" assigned to the record last appended to the log 100, e.g., record with sequence number "(1,3)," from the metadata store 220, and increments the epoch number to "2" and resets the count to "1" and assigns the sequence number "(2,1)" to the fourth record 125. After the sequence number is assigned, the third log sequencer 240 stores the fourth record 125 at one or more of the storage nodes 250. In some embodiments, the storage of a specified record at one or more of the storage nodes 250 is performed by a log sequencer that is currently assigned to manage the storage of log 100, and as described above, at any given instance, only one log sequencer can be assigned to manage the storage of a specified log.

Referring back to storing the first record 110 at the log device 205, after the sequence number is assigned to the first record 110, the first log sequencer 210 stores the record at one or more of the storage nodes 250. In some embodiments, the first log sequencer 210 determines the storage node at which the first record 110 is to be stored using a non-deterministic method. This way of determining the storage nodes can help in providing high write-availability as the log device 205 makes available a larger pool of storage nodes to select from for storing each of the records of the log 100. In some embodiments, the user can further customize the selection of storage nodes for one or more of the logs. For example, the user can specify that the records of the log 100 are to be stored among the storage nodes 225-235. In another example, the user can specify that the records of the log 100 can be stored in any of the storage nodes 250.

In some embodiments, the first log sequencer 210 can store multiple copies of the first record 110, e.g., at different storage nodes. For example, the first record 110 is stored at the storage node A 225 and the storage node B 230. The first log sequencer 210 can also store information regarding the storage nodes at which each of the records of a log are stored in the metadata store 220, e.g., to be used by the reader 265 for retrieving the records 105 of the log 100.

The reader 265 can obtain the list of storage nodes that store the records 105 of the log 100 from the metadata store 220 and perform a read operation at each of the storage nodes from the list to obtain the records 105. After the records 105 are obtained, they can be arranged in a sequence, e.g., based on their associated sequence numbers, to generate the log 100.

In some embodiments, the log sequencers, e.g., the first log sequencer 210, can be implemented using computers without any persistent storage medium, e.g., a disk drive, as their functionality, e.g., issuing sequence numbers, does not involve storing any data. By not using persistent storage medium in log sequencers, the costs involved in deploying resources can be minimized. In some embodiments, the log sequencer can be an application executing on a server computer (not illustrated) in the distributed computing system 200 or part of an application executing on the server computer.

In some embodiments, a storage node, e.g., storage node A 225, can be a computer in the distributed computing system 200 with an associated persistent storage medium at which data, e.g., records 105, can be stored. In some embodiments, the storage node can be an application and/or a process executing on a server computer (not illustrated) in the distributed computing system 200 or part of an application and/or process executing on the server computer.

In some embodiments, the log sequencer and the storage node can be implemented on the same computer in the distributed computing system 200.

Figure 3:
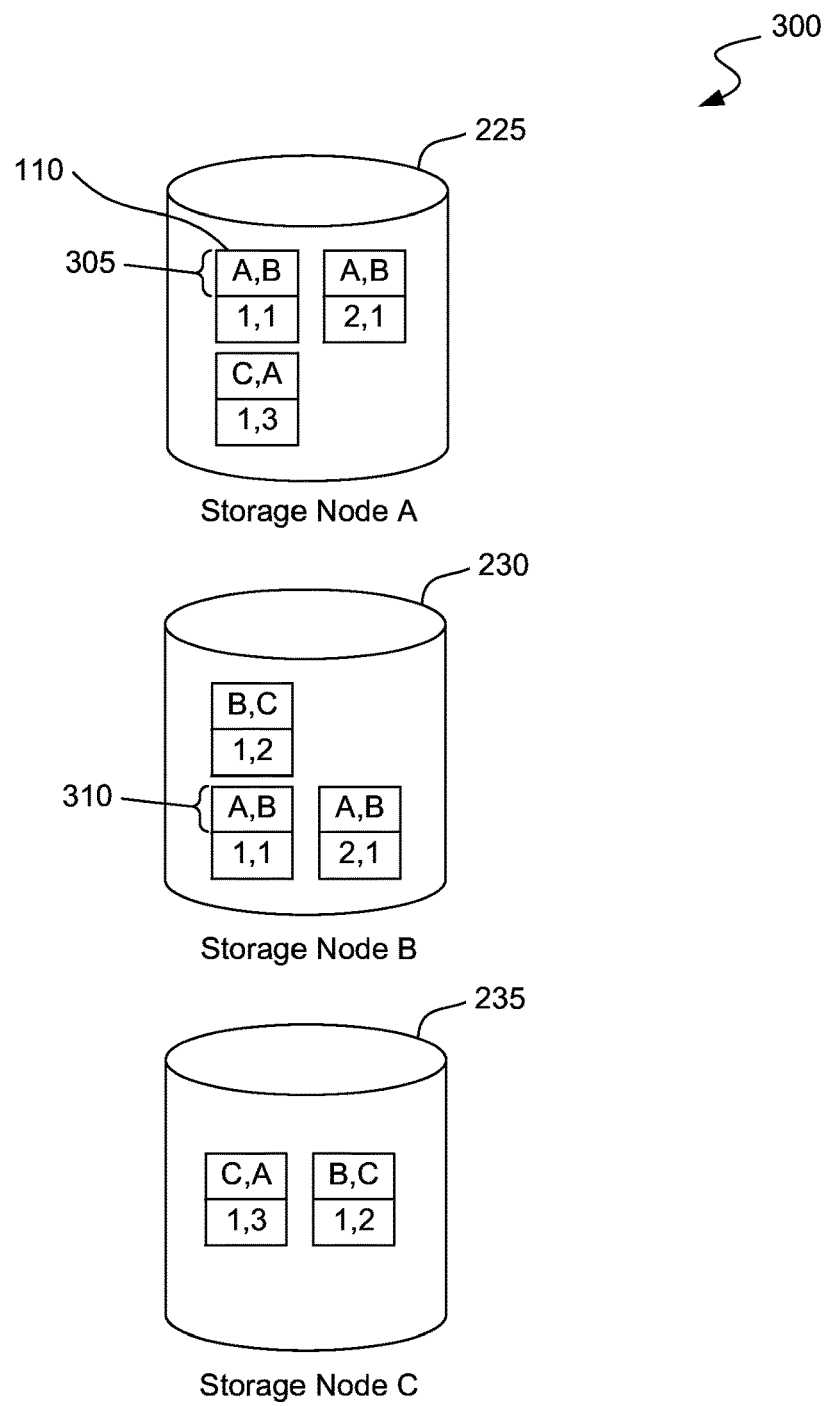
FIG. 3 is a block diagram illustrating an example of placement of records of the log of FIG. 1C in the storage nodes of the log device of FIG. 2, consistent with various embodiments.

FIG. 3 is a block diagram of an example 300 illustrating placement of records of the log 100 in the storage nodes of the log device of FIG. 2, consistent with various embodiments. The example 300 illustrates multiple replicas of records 105 placed across storage nodes, e.g., the storage node A 225, the storage node B 230 and the storage node C 235. In the example 300, the number of replicas for each of the records is "2." However, the number of replicas is configurable. In some embodiments, the number of replicas can be different for different logs.

In some embodiments, each of the records 105 stored at a storage node also includes information regarding storage nodes where the other replicas of the corresponding record are stored. For example, the first record 110 at the storage node A 225 has a location information field 305 which indicates that the first record 110 is stored at storage node A 225 and storage node B 230. Similarly, the first record 110 stored at the storage node B 230 includes a second location information field 310, which indicates that the first record 110 is stored at storage node A 225 and storage node B 230.

In some embodiments, the location information field can be included as a field in a header of the first record 110. In some embodiments, the location information facilitates the reader 265 in performing a read operation in various modes, which is described in detail at least with reference to FIGS. 4A and 4B. In some embodiments, the storage nodes are listed in the location information in decreasing order of preferred storage nodes for retrieving the corresponding record from. For example, in the location information field 305 of the first record 110, the storage nodes are listed in the order of "storage node A" followed by "storage node B." Such order indicates that the "storage node A" is the most preferred storage node for retrieving the first record 110 from and that the "storage node B" is the less preferred one.

In some embodiments, if the number of replicas were "3", then a specified record can be stored in three storage nodes and the location information of the specified record can include three storage nodes, e.g., "storage node A" followed by "storage node C" followed by "storage node B". Such order can indicate that "storage node A" is the most preferred storage node for obtaining the first record 110 from, "storage node B" is the least preferred storage node and "storage node C" is less preferred than "storage node A" but more preferred than "storage node B." Note that other methods can be used in identifying the most preferred and least preferred storage nodes.

Figure 4A:
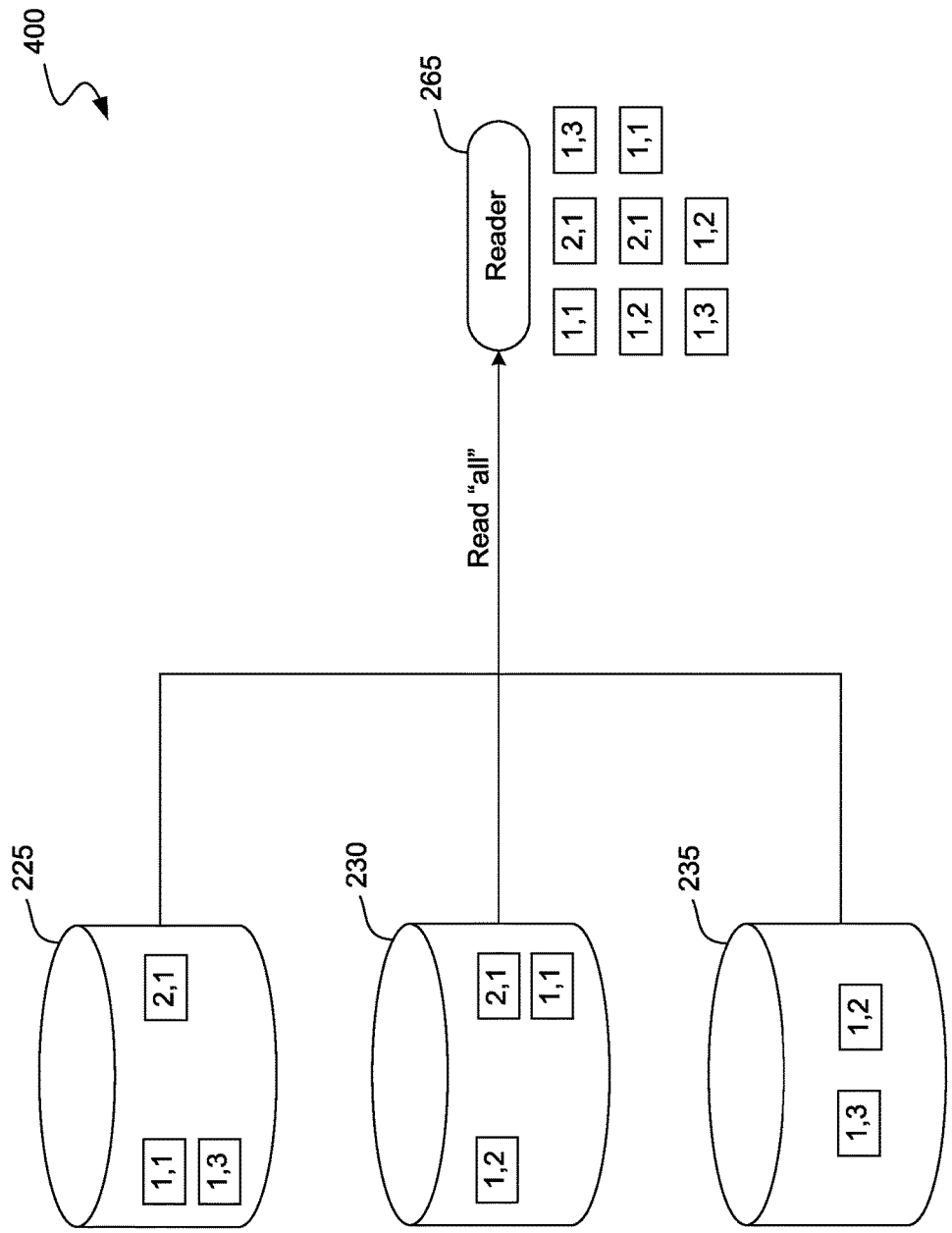
FIG. 4A is a block diagram of an example for retrieving records of a log of FIG. 1C from the storage nodes of the log device of FIG. 2 in a first mode, consistent with various embodiments.

FIG. 4A is a block diagram of an example 400 for retrieving records of the log 100 from the storage nodes of the log device of FIG. 2 in a first mode, consistent with various embodiments. The reader 265 can retrieve the records 105 of the log 100 from the storage nodes using one or more read modes. The reader 265 can obtain a list of the storage nodes that store the records of the log 100 from the metadata store 220. In the first mode, also referred to as a "read-all" mode, the reader 265 retrieves all copies of each of the records 105 of the log 100.

For example, the reader 265 performs a read operation on each of the storage nodes, e.g., storage node A 225, storage node B 230, and storage node C 235, that store records of the log 100 in "read-all" mode. The storage node A 225 returns a copy of all the records, e.g., records with sequence numbers (1, 1), (1, 3) and (2, 1), stored at the storage node A 225. Similarly, the storage node B 230 returns a copy of all the records, e.g., records with sequence numbers (1, 1), (1, 2) and (2, 1), stored at the storage node B 230. Similarly, the storage node C 235 returns a copy of all the records, e.g., records with sequence numbers (1, 2) and (1, 3) and (2, 1), stored at the storage node C 235. That is, in the "read-all" mode, the reader 265 obtains multiple copies of all the records 105 of the log 100. The reader 265 can filter the duplicate copies of the records to obtain a single copy of the records 105 and then order the records 105 based on their corresponding sequence numbers. In some embodiments, the reader 265 can include a portion of the log device 205, e.g., a log device library, that can perform the retrieval and sequencing of the records 105. The reader 265 can arrange the records 105 prior to consuming the log 100.

In some embodiments, the "read-all" mode provides very good read availability as a specified record is read from more than one storage node. The unavailability of one storage node does not make the records stored at that storage node unavailable, as those records can obtained from other storage nodes, thereby providing an improved read availability. However, the "read-all" mode can lead to increased network traffic and therefore, increased consumption of network bandwidth, as duplicate copies of the records are retrieved.

Figure 4B:
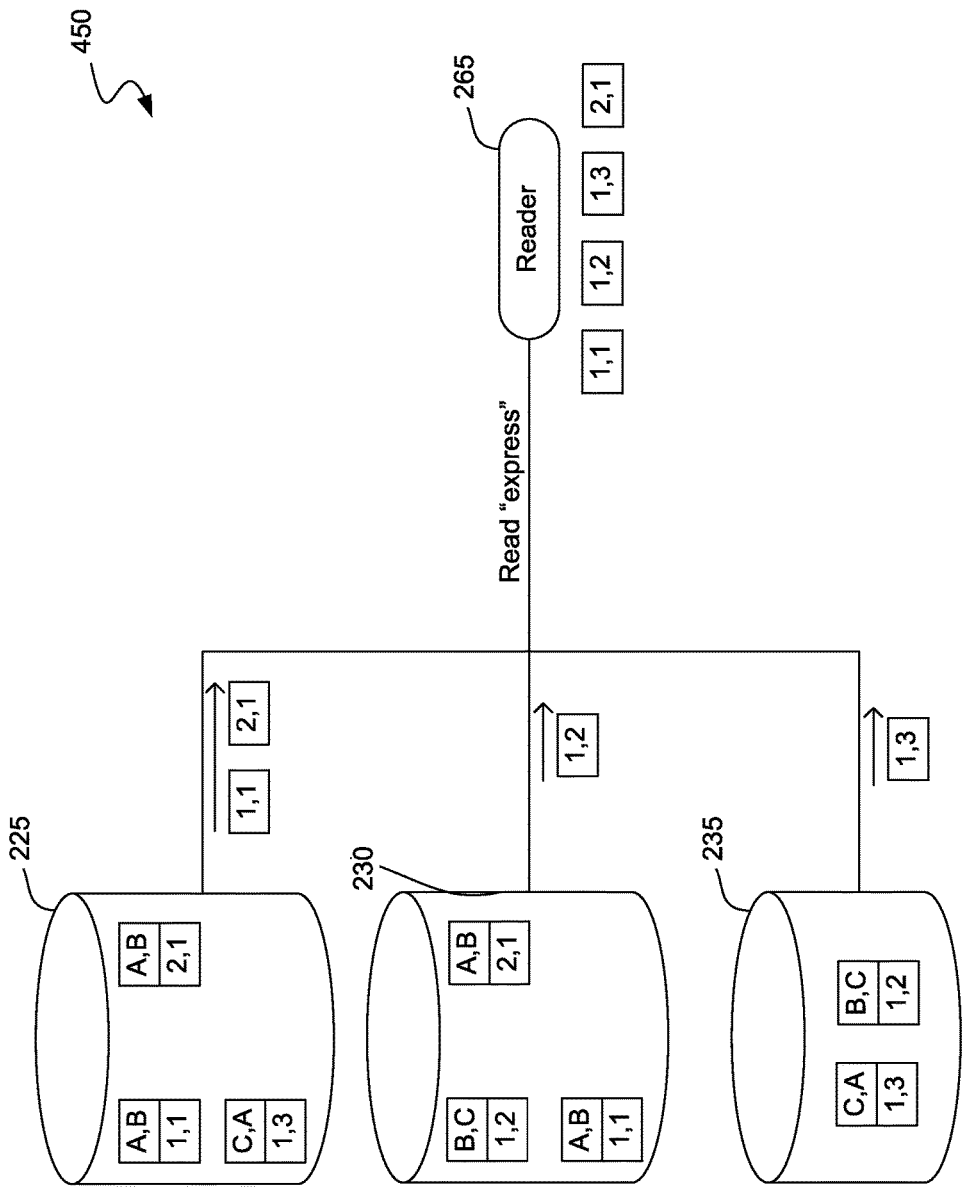
FIG. 4B is a block diagram of an example for retrieving records of a log of FIG. 1C from the storage nodes of the log device of FIG. 2 in a second mode, consistent with various embodiments.

FIG. 4B is a block diagram of an example 450 for retrieving records of the log 100 from the storage nodes of the log device of FIG. 2 in a second mode, consistent with various embodiments. In the second mode, also referred to as a "read-express" mode, the reader 265 performs a read operation at each storage node of the list of storage nodes requesting the corresponding storage node to return all the records of the log 100 for which the corresponding storage node is the most preferred storage node. In some embodiments, the storage node listed first in the location information of the record, e.g., location information field 305 of the first record 110 in FIG. 3, is the most preferred storage node. For example, the reader 265 performs a read operation on each of the storage nodes, e.g., storage node A 225, storage node B 230, and storage node C 235, in "read-express" mode. The storage node A 225 returns a copy of the records with sequence numbers (1, 1), and (2, 1) for which it is the most preferred storage node. Similarly, the storage node B 230 returns a copy of the record with sequence number (1, 2) for which it is the most preferred storage node. Similarly, the storage node C 235 returns a copy of the record with sequence number (1, 3) for which it is the most preferred storage node. That is, in the "read-express" mode, the reader 265 obtains a single copy of the records 105 of the log 100. Since the reader 265 is obtaining only a single copy of the records, there may not be any need to filter duplicate copies. The reader 265 may just have to arrange the records 105 in a sequence based on their corresponding sequence numbers.

In some embodiments, the "read-express" mode facilitates quick retrieval of the records as only one copy of the records 105 are retrieved from the storage nodes. Further, the "read-express" mode may also minimize the consumption of network bandwidth, as only a single copy of the record, as opposed to duplicate copies in the read-all mode, is retrieved. However, the "read-express" mode may provide less write availability compared to the "read-all" mode since if the most preferred storage node becomes unavailable, e.g., due to a failure, the records stored at that storage node may become unavailable.

Accordingly, in some embodiments, the read modes provide a trade-off between read availability and network bandwidth consumption.

In some embodiments, the read-express may be customized for the reader to perform the read on a next preferred storage node if the most preferred storage node is unavailable. For example, if the storage node A 225 is unavailable, the reader 265 can obtain the record (1, 1) from the next preferred storage node, storage node B 230. In some embodiments, this customized read-express mode can be configured as a separate read mode.

Figure 5:
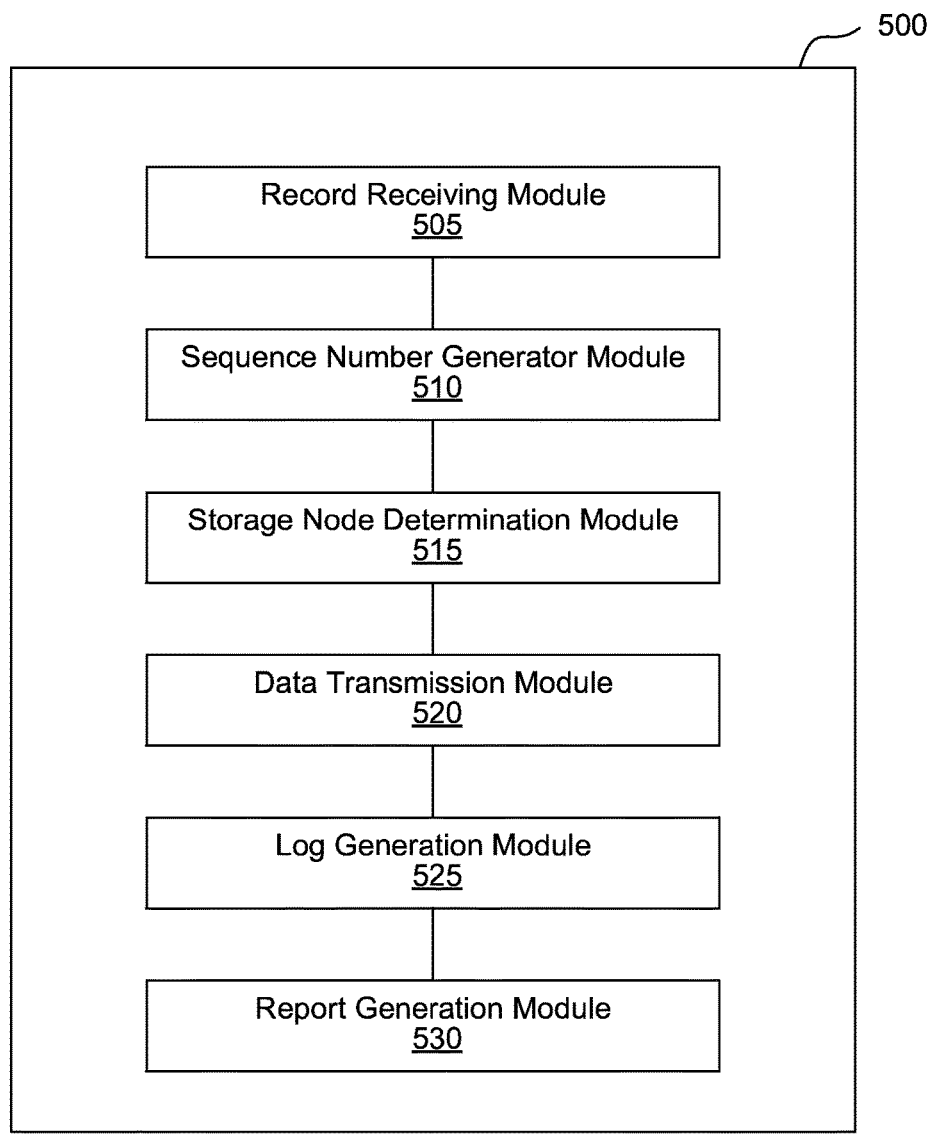
FIG. 5 is a block diagram of a log device for facilitating read and/or write access to the log of FIGS. 1A-1C, consistent with various embodiments.

FIG. 5 is a block diagram of a log device 500 for facilitating read and/or write access to the log 100, consistent with various embodiments. In some embodiments, the log device 500 is similar to the log device 205 of FIG. 2. The log device 500 includes a record receiving module 505 that is configured to receive records, e.g., records 105 from writers 260, to be written into one or more logs in the distributed computing system 200.

The log device 500 includes a sequence number generator module 510 that generates a sequence number and assigns the sequence number to a record to be appended to a log. For example, the sequence number generator module 510 can generate the sequence number 115 and assign the sequence number to the first record 110 of log 100, at least as described with reference to FIGS. 1 and 2. In some embodiments, the sequence number assigned to a record is unique within the log to which the record is to be appended. In some embodiments, the records of the log are delivered to a reader in the order of their associated sequence numbers.

The log device 500 includes a storage node determination module 515 that determines one or more storage nodes at which a specified record is to be stored. In some embodiments, the storage node determination module 515 uses a non-deterministic method to identify a storage node at which a specified record is to be stored.

The log device 500 includes a data transmission module 520 that transmits the record from the log sequencer to the determined storage nodes for storage at their corresponding persistent storage medium. In some embodiments, the data transmission module 520 can also include location information of a record, e.g., location information field 305 of the first record 110, that indicates the storage nodes at which the record is stored.

The log device 500 includes a log generation module 525 that facilitates retrieving the records of a log from the storage nodes. The log generation module 525 can determine the storage nodes at which the records of a log are stored, e.g., by querying the metadata store 220, and obtain the records from the determined storage nodes using one or more read modes, as described at least with respect to FIGS. 4A and 4B. The log device 500 can also facilitate in arranging the retrieved records in sequence prior to the log being consumed by a reader.

The log device 500 includes a report generation module 530 that facilitates in generating any of alerts, notifications and reports regarding various aspects of the log device, including any anomalies, e.g., missing data records and failure of log sequencer, storage nodes. For example, when the log generation module 525 identifies a change in the epoch number between two contiguous records in the sequence, e.g., between records with sequence numbers (1, 3) and (2, 1), it determines that the change could have been caused due to a failure of the log sequencer. Since the log sequencer had failed there are chances that records received during that time, e.g., after the log sequencer failed and before the new log sequencer was instantiated, could have been lost. That is, there can be one or more records of the log missing between the records with sequence numbers (1, 3) and (2, 1). The report generation module 530 can generate notifications regarding such anomalies and send them to a specified user, e.g., an administrator of the distributed computing system 200. Even if there were no records missing, the sequence numbering system can be still useful in identifying other anomalies. For example, a frequent change in the epoch number can indicate that the log sequencers are failing often. Such notifications can be useful for the administrator to take proper corrective measures.

Note that the modules of the log device 500, e.g., modules 505-530, can be implemented in a distributed manner. That is, one or more of the modules 505-530 can be implemented in any of the components of the log device 205 or writers and readers. For example, the record receiving module 505, the sequence number generator module 510, the storage node determination module 515 and the data transmission module 520 can be implemented in a log sequencer, e.g., the first log sequencer 210. The log generation module 525 can be implemented in a reader, e.g., reader 265, of the distributed computing system 200. The report generation module 530 can be implemented as a stand-alone module.

Figure 6:
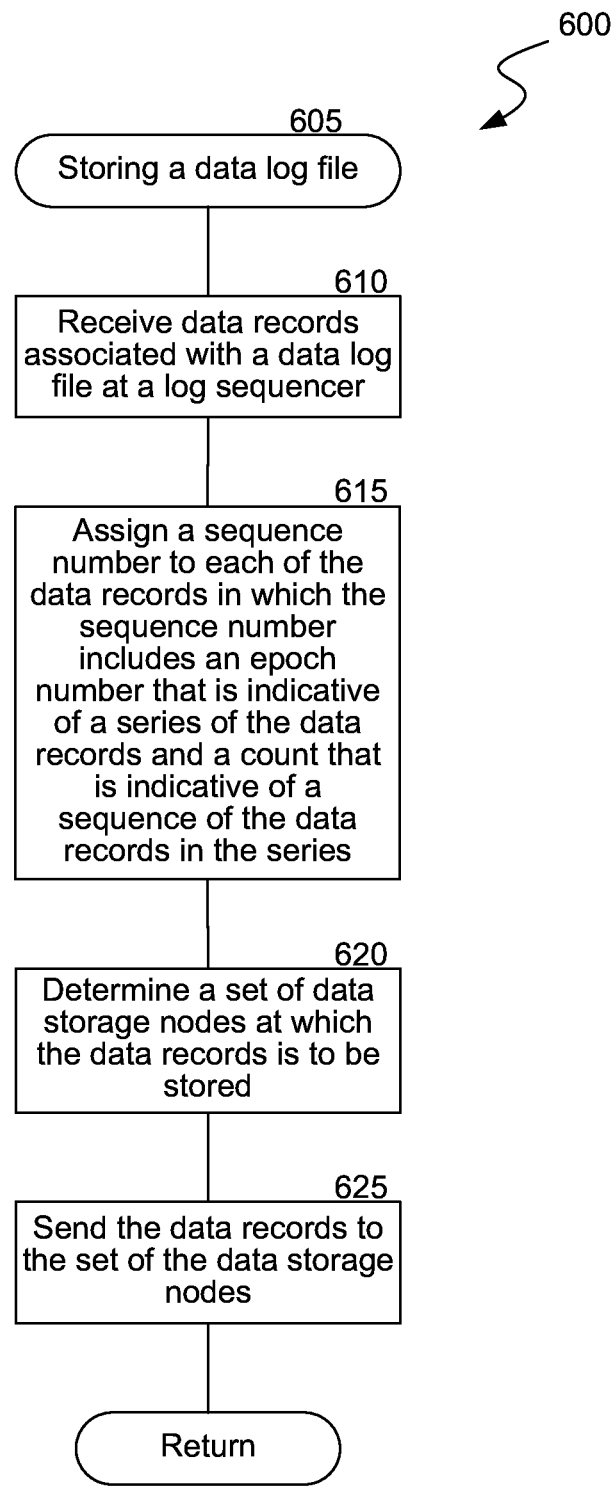
FIG. 6 is a flow diagram of a process of storing records of a log of FIGS. 1A-1C in a distributing computing system of FIG. 2, consistent with various embodiments.

FIG. 6 is a flow diagram of a process 600 of storing records of the log 100 in a distributing computing system, consistent with various embodiments. In some embodiments, the process 600 may be executed in the distributed computing system 200 of FIG. 2 and using the log device 500 of FIG. 5. The process 600 begins at block 605, and at block 610, the record receiving module 505 of a log sequencer receives one or more records to be appended to a log from one or more writers. For example, the first writer 261 can request the first log sequencer 210 to append the first record 110 to the log 100. In some embodiments, the records can include the log ID of the log with which they are associated.

At block 615, the sequence number generator module 510, assigns a sequence number to the record, as described at least in association with FIGS. 1 and 2. The sequence numbers can indicate a sequence in which the records are to be delivered to a reader of the log. For example, the first writer 261 assigns sequence numbers to one or more of the records 105 of the log 100. In some embodiments, a sequence number includes an epoch number and a count. The epoch number can be indicative of a specified series of a sequence of records in the log, and a count can be indicative of a sequence of a record in the specified series. In some embodiments, the epoch number is a monotonically increasing number which is increased on occurrence of specified events in the distributed computing system 200, e.g., on a failover from one log sequencer to another log sequencer. In some embodiments, the count is a monotonically increasing number which is incremented within a specified epoch number at the receipt of a record at the log sequencer. In some embodiments, the epoch number changes less often than the count.

In assigning the sequence number to a record, a log sequencer, e.g., the first log sequencer 210 determines whether the record is a first record to be appended to a log, e.g., the log 100. If the record is the first record to be appended, the first log sequencer 210 assigns a specified start value of the epoch number, e.g., "1," and a specified start value of the count, e.g., "1" to the record, e.g., the first record 110. Further, the first log sequencer 210 can write the value of the current epoch number being used to assign to the records of the log 100 to the metadata store 220. However, if the record is not a first record to be appended to the log 100, e.g., it is a second record such as the second record 120, the first log sequencer 210 assigns the current epoch number, and a count that is next in sequence of records in the current epoch number, to the record. In some embodiments, the first log sequencer 210 can obtain the current epoch number being assigned to the records of the log 100 from the metadata store 220 and assign it the second record 120. In some embodiments, the first log sequencer 210 can determine the count as a function of the count of the record last appended to the log 100 by the first log sequencer 210, e.g., incrementing the count of the record last appended by "1," and assign the updated count to the second record 120.

On occurrence of a specified event, e.g., failover from the first log sequencer 210 to a third log sequencer 240, the third log sequencer 240 assumes the role of assigning sequence numbers to the records to be appended to the log 100, and facilitating storing the records at the storage nodes 250. When the third log sequencer 240 starts assigning the sequence numbers to the records to be appended to the log 100, the third log sequencer 240 changes the epoch number to be assigned to indicate a beginning of a new series of records. For example, the third log sequencer 240 obtains the epoch number last assigned to the records of the log 100 from the metadata store 220, and updates the retrieved epoch number, e.g., increments it by "1," which indicates the next series. The third log sequencer 240 also resets the count to be assigned to the record to a start value, e.g., "1" indicating that the record is a first record in the series of records with epoch number "2." For example, in the distributed computing system 200, the fourth record 125 is the first to arrive at the third log sequencer 240 after the third log sequencer 240 is failed over from the first log sequencer 210. The third log sequencer 240 obtains the epoch number "1" assigned to the record last appended to the log 100, e.g., record with sequence number "(1, 3)," from the metadata store 220. The third log sequencer 240 increments the epoch number to "2," resets the count to "1" and assigns the sequence number "(2, 1)" to the fourth record 125. As described above, at any given instance, only one log sequencer can be assigned to manage the storage of a specified log.

After a sequence number is assigned to a record, at block 620, the storage node determination module 515 determines one or more of the storage nodes at which the record is to be stored. In some embodiments, the storage node determination module 515 determines the storage node at which the record is to be stored using a non-deterministic method. In some embodiments, a configurable number of replicas of a record can be stored. Accordingly, the storage node determination module 515 can non-deterministically determine one or more of the storage nodes at which the record is to be stored.

At block 625, the data transmission module 520 transmits the record to the determined storage nodes. In some embodiments, the data transmission module 520 also includes information regarding the storage nodes at which the record is to be stored, e.g., as location information in a header of the record.

After the storage nodes receive the record they store it in their associated persistent storage medium.

Figure 7:
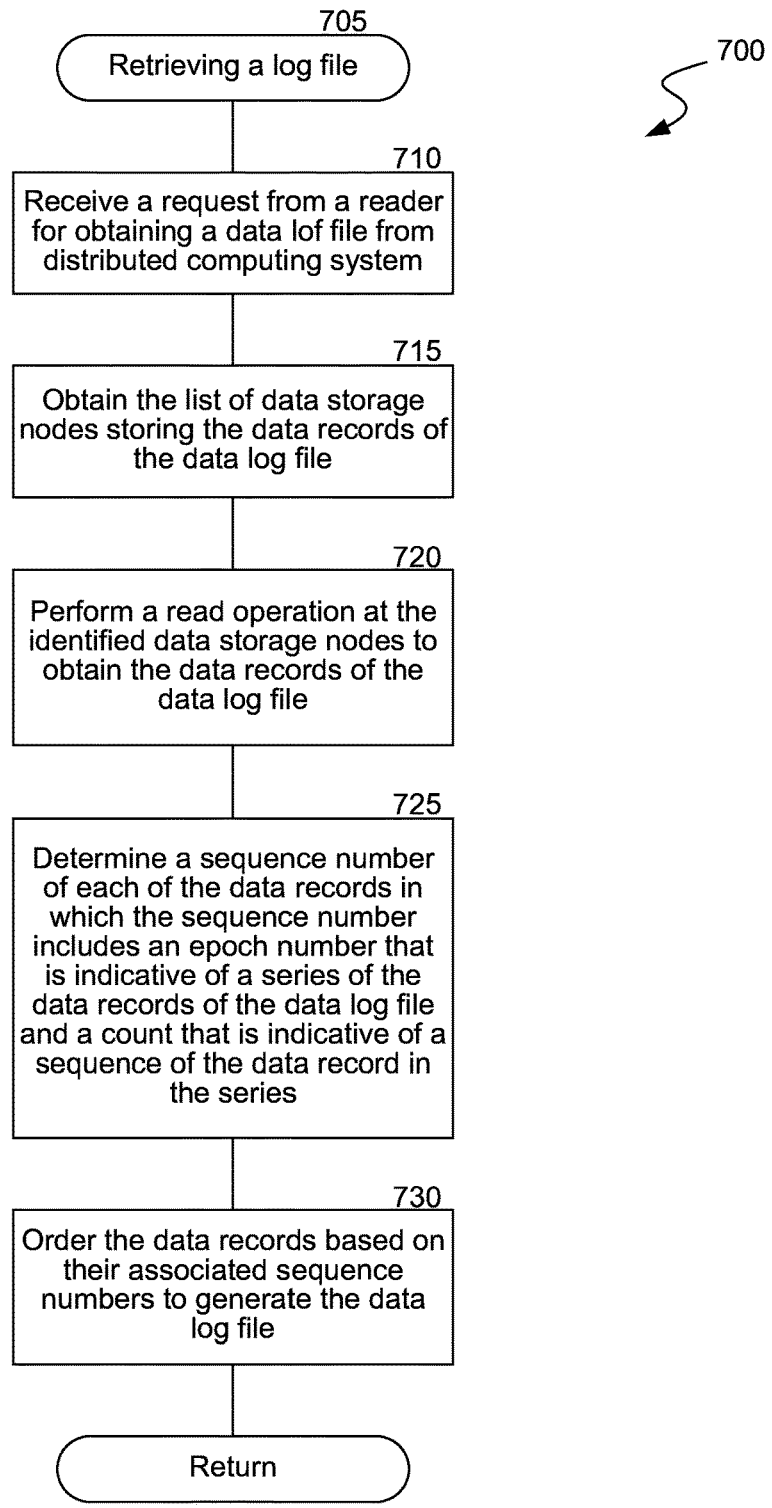
FIG. 7 is a flow diagram of a process of retrieving a log of FIGS. 1A-1C from a distributing computing system of FIG. 2, consistent with various embodiments.

FIG. 7 is a flow diagram of a process 700 of retrieving the log 100 from a distributing computing system, consistent with various embodiments. In some embodiments, the process 700 may be executed in the distributed computing system 200 of FIG. 2 and using the log device 500 of FIG. 5. The process 700 begins at block 705, and at block 710, the log generation module 525 receives a request from a reader, e.g., the reader 265, to obtain a log file, e.g., the log 100, from the distributed computing system 200. In some embodiments, the request can include the log ID.

At block 715, the log generation module 525 obtains the list of storage nodes that store the records of the log from a metadata store of the log device 500. In some embodiments, the log generation module 525 uses the log ID from the request to query the metadata store 220 to obtain the storage nodes which store the records, e.g., records 105, of the log 100.

At block 720, the log generation module 525 retrieves the records 105 from the storage nodes in the list. In some embodiments, the log generation module 525 can perform the read operation in one or more modes to retrieve the records 105. If the log generation module 525 performs the read in a first mode, multiple replicas of each of the records 105 are retrieved from the storage nodes. If the log generation module 525 performs the read in a second mode, a single replica of each of the records 105 are retrieved from the storage nodes.

After retrieving the records 105, at block 725, the log generation module 525 extracts the sequence numbers of each of the records 105. As described above, the sequence numbers indicate a sequence in which the records 105 are to be delivered to a reader, e.g., the reader 265. In some embodiments, if the log generation module 525 obtained the records 105 from the storage nodes in the first mode, then the log generation module 525 filters the duplicate copies of the records 105 prior to extracting the sequence numbers to retain only a single copy of each of the records 105.

At block 730, the log generation module 525 arranges the records 105 in a sequence based on the extracted sequence numbers, to generate the log file 100. The log generation module 525 then delivers the log file 100 to the reader 265.

In some embodiments, the log generation module 525 can seek to a specific record and/or a specific range of records in the log 100 using the sequence numbers of the records 105. This can be a very useful feature, e.g., in cases where only a portion of the log 100 is needed as the reader 265 does not have to obtain the whole log file 100, thereby saving computing resources.

In some embodiments, all records stored in the log 100 can be timestamped with the current wall-clock time on the log sequencer when the record is appended. This can facilitate the readers to seek to a timestamp and replay, for instance, the last hour or a specified period's worth of records in the log 100.

Figure 8:
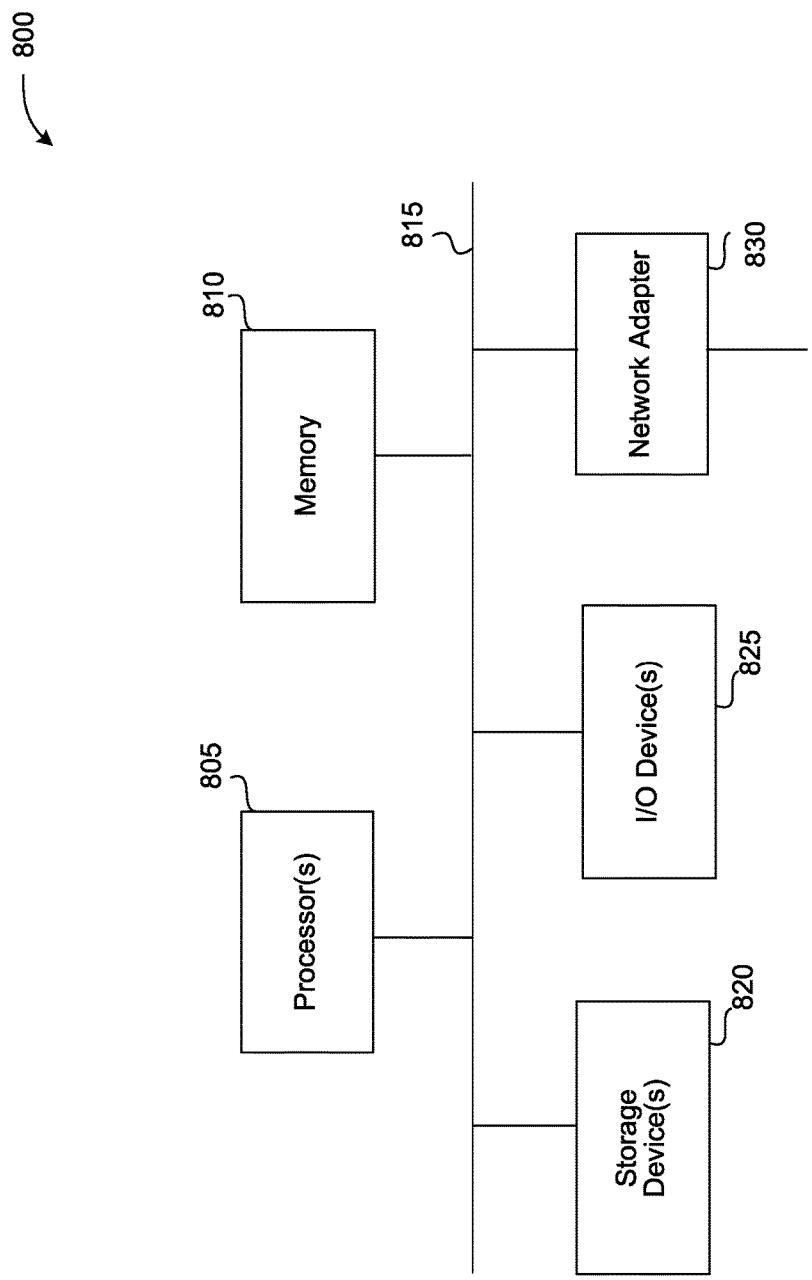
FIG. 8 is a block diagram of a processing system that can implement operations of the present invention.

FIG. 8 is a block diagram of a computer system as may be used to implement features of the disclosed embodiments. The computing system 800 may be used to implement any of the entities, components or services depicted in the examples of the foregoing figures (and any other components and/or modules described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:
   receiving, from a writer external to the computing system, multiple data records associated with a data log file at a log sequencer computer of the computing system, the data log file to be stored as a sequence of the data records;
   assigning, by the log sequencer computer, a sequence number to a first data record of the data records, wherein the sequence number includes an epoch number and a count, the epoch number indicative of a series of the data records of the data log file, the count indicative of a sequence of the first data record in the series, the count being increased monotonically within the series at the arrival of every data record at the log sequencer computer;
   identifying, by the log sequencer computer and using a non-deterministic method, a set of multiple data storage nodes at which the data records are to be stored; and
   storing the data records at the set of multiple data storage nodes, wherein multiple copies of the first data record are stored at different storage nodes and a list of the different storage nodes ordered from a most preferred data storage node to a least preferred storage node are stored with the first data record.

2. The method of claim 1 further comprising:
   storing identification information of the set of multiple data storage nodes in a metadata store of the computing system.

3. The method of claim 1, wherein receiving the data records associated with the data log file includes:
   identifying, based on a log ID in the first data record, the data log file with which the first data record is associated,
   identifying the log sequencer computer that is managing the storage of the data log file, the log sequencer computer being one of multiple log sequencer computers in the computing system, and
   requesting the log sequencer computer to facilitate storing the first data record.

4. The method of claim 3, wherein different log sequencer computers manage storage of different data log files.

5. The method of claim 1, wherein assigning the sequence number to the first data record includes storing the epoch number in a metadata store of the computing system.

6. The method of claim 1 further comprising:
   determining that a first instance of the log sequencer computer is terminated,
   instantiating a second instance of the log sequencer computer in the computing system, and
   receiving a second data record of the data records at the log sequencer computer,
   updating, by the log sequencer computer, the sequence number to a second sequence number, the updating indicative of a change in the instance of the log sequencer computer, and
   assigning, by the log sequencer computer, the second sequence number to the second data record.

7. The method of claim 6, wherein updating the sequence number includes:
   updating the epoch number to generate a second epoch number of the second sequence number, the updating indicative of a beginning of a second series of data records, and
   setting a second count of the second sequence number to a start value indicating a beginning of a sequence of data records in the second series.

8. The method of claim 7, wherein updating the epoch number to generate the second epoch number includes:
   obtaining the epoch number associated with the data log file from a metadata store of the computing system, and
   incrementing the epoch number by a specified unit to generate the second epoch number.

9. The method of claim 1, wherein the epoch number to be assigned to a second data record of the data records is changed to a second value in an event the instance of the log sequencer computer is replaced with at least one of a second instance of the log sequencer computer or a third instance of a second log sequencer computer in the computing system.

10. The method of claim 1 further comprising:
comparing the epoch number of the first data record of the data records and a second epoch number of a second data record of the data records; and
determining that one or more data records of the data log file between the first data record and the second data record are missing.

11. The method of claim 1 further comprising:
receiving a request from a reader computer for obtaining the data log file from the computing system;
performing a read at the data storage nodes to obtain the data records associated with the data log file;
arranging the data records in a sequence based on their corresponding sequence numbers to generate the data log file; and
returning the data log file to the reader computer.

12. The method of claim 11, wherein performing the read at the data storage nodes includes:
performing the read in a first mode, the first mode causing a first data storage node of the data storage nodes to return a specified data record of the data log file stored at the first data storage node even if the first data storage node is not designated as a most preferred data storage node for obtaining the specified data record from.

13. The method of claim 11, wherein performing the read at the data storage nodes includes:
performing the read in a second mode, the second mode causing a first data storage node of the data storage nodes to return a specified data record of the data log file stored at the first data storage node if the first data storage node is a most preferred data storage node for obtaining the specified data record from.

14. A non-transitory computer-readable storage medium storing computer-readable instructions, the instructions comprising:
instructions for receiving a request from a reader computer for obtaining a data log file stored in a computing system, wherein the data log file is stored as a sequence of data records in the computing system and multiple copies of each data record are stored at different storage nodes and a list of the different storage nodes ordered from a most preferred data storage node to a least preferred storage node are stored with each of the multiple copies of the data records;
instructions for identifying a set of data storage nodes of the computing system storing the data records of the data log file;
instructions for performing a read operation at the set of data storage nodes to obtain the data records of the data log file;
instructions for determining sequence numbers of the data records, wherein a sequence number of a first data record of the data records includes an epoch number and a count, the epoch number indicative of an instance of a log sequencer that assigned the sequence numbers, the count indicative of a sequence of the first data record in the series; and
instructions for arranging the data records based on their associated sequence numbers to generate the data log file.

15. The non-transitory computer-readable storage medium of claim 14 further comprising:
instructions for comparing the epoch number of the first data record of the data records and a second epoch number of a second data record of the data records; and
instructions for determining that one or more data records of the data log file between the first data record and the second data record are missing.

16. A system, comprising:
a processor;
physical memory storing computer-executable instructions that, when executed by the processor, cause the processor to:
receive multiple data records associated with a data log file at a log sequencer computer in a distributed computing system, the data log file to be stored as a sequence of the data records;
assign a sequence number to a first data record of the data records, wherein the sequence number includes an epoch number and a count, the epoch number indicative of a series of the data records of the data log file, the count indicative of a sequence of the first data record in the series, the count being increased monotonically at the arrival of every data record at the log sequencer computer;
determine a set of multiple data storage nodes at which the data records is to be stored; and
facilitate storing the data records at the set of the data storage nodes, wherein multiple copies of each data record are stored at different storage nodes and a list of the different storage nodes ordered from a most preferred data storage node to a least preferred storage node are stored with each data record.

17. The system of claim 16, wherein the computer executable instructions further cause the processor to:
generate a report containing information regarding missing data records, wherein the missing data records are determined by:
comparing the epoch number of the first data record of the data records and a second epoch number of a second data record of the data records; and
determining that one or more data records of the data log file between the first data record and the second data record are missing.

* * * * *